United States Patent [19]

Hamada et al.

[11] Patent Number: 5,581,544
[45] Date of Patent: Dec. 3, 1996

[54] METHOD AND APPARATUS FOR EVALUATING QOS IN ATM MULTIPLEXING APPARATUS IN WHICH PRIORITY CONTROL IS PERFORMED AND FOR CONTROLLING CALL ADMISSIONS AND OPTIMIZING PRIORITY CONTROL ON THE BASIS OF THE EVALUATION

[75] Inventors: Takeo Hamada; Takafumi Chujo, both of Kawasaki, Japan

[73] Assignee: Fujitsu Limited, Kawasaki, Japan

[21] Appl. No.: 313,736

[22] Filed: Sep. 27, 1994

[30] Foreign Application Priority Data

Dec. 24, 1993 [JP] Japan .................................. 5-327025

[51] Int. Cl.⁶ .............................. H04J 3/14; H04L 12/56
[52] U.S. Cl. ......................................... 370/253; 370/462
[58] Field of Search .................... 370/17, 94.1, 94.2, 370/85.6, 84

[56] References Cited

U.S. PATENT DOCUMENTS

| | | | |
|---|---|---|---|
| 5,224,091 | 6/1993 | Brandt | 370/85.6 |
| 5,231,633 | 7/1993 | Hluchyj et al. | 370/94.1 |
| 5,268,900 | 12/1993 | Hluchyj et al. | 370/94.1 |
| 5,280,483 | 1/1994 | Kamoi et al. | 370/94.1 |
| 5,313,579 | 5/1994 | Chao | 370/94.1 |
| 5,367,523 | 11/1994 | Chang et al. | 370/84 |
| 5,388,097 | 2/1995 | Baugher et al. | 370/85.6 |

FOREIGN PATENT DOCUMENTS 9421068  9/1994  WIPO.

*Primary Examiner*—Douglas W. Olms
*Assistant Examiner*—Min Jung

[57] ABSTRACT

A probability transition matrix $S_t$ is formulated that expresses a multiplexing process which includes nested threshold priority control and classified priority control. A state equation using the matrix $S_t$ is solved by substituting therein upper and lower bounds of a probability distribution of a cell arrival count $a_t$ in an average time series, to calculate a probability distribution of a cell length in a buffer. From the thus calculated cell length probability distribution, the QOS is evaluated on a priority class basis. Based on the QOS evaluation, optimization of call admission control and priority control is accomplished.

16 Claims, 6 Drawing Sheets

```
DETERMINE AND STORE DATA OF THE UPPER AND LOWER
BOUNDS FOR THE PROBABILITY DISTRIBUTION OF THE
NUMBER OF ARRIVALS $a_t$ AT EACH APPEARANCE VALUE
OF THE ARRIVAL RATE $r_t$
```
— 1300

```
DETERMINE UPPER AND LOWER BOUNDS OF THE
PROBABILITY DISTRIBUTION OF THE ARRIVAL RATE $r_t$
OF THE CALL ADMITTED STATE
```
— 1301

```
FOR EACH OF A PLURALITY OF APPEARANCE VALUES OF
THE ARRIVAL RATES, CALCULATE MATRIX $S_t$ USING
DATA OF S1
```
— 1302

```
SOLVE THE STATE EQUATION (4) USING THE
CALCULATED RESULT
```
— 1303

```
CALCULATE THE UPPER AND LOWER LIMIT VALUES OF
THE QOS PARAMETERS FOR EACH APPEARANCE VALUE
OF THE ARRIVAL RATE $r_t$ USING THE RESULT OF S3
```
— 1304

```
OBTAIN THEIR WEITED AVERAGE VALUES USING THE
RESULT OF S2
```
— 1305

FIG. 7

METHOD AND APPARATUS FOR EVALUATING QOS IN ATM MULTIPLEXING APPARATUS IN WHICH PRIORITY CONTROL IS PERFORMED AND FOR CONTROLLING CALL ADMISSIONS AND OPTIMIZING PRIORITY CONTROL ON THE BASIS OF THE EVALUATION

BACKGROUND OF THE INVENTION

1. Field of the Invention

The present invention relates to a method and apparatus for evaluating the quality of service (QOS) in an ATM multiplexing apparatus in which priority control by buffer reservation (nested threshold) or priority control using a classified priority control scheme (quality control with multiple queues) is performed, and for controlling call admissions and optimizing the priority control on the basis of the evaluation.

Demand for broader-band and larger-capacity communications services has urged the development of the broadband aspects of integrated services digital network (B-ISDN), and asynchronous transfer mode (ATM) has been drawing attention as the switching/transmission system for B-ISDN. To use transmission channels efficiently and transmit large volumes of information economically and safely, the development of an efficient multiplexing transmission system is essential. The present invention is devised to meet such needs.

2. Description of the Related Art

A variety of priority control schemes have been proposed for effectively multiplexing cells with different QOS requests in ATM multiplexing apparatus.

In a priority control scheme called preemptive resume priority, a single common buffer is used, and when high-priority and low-priority cells are stored in the buffer, the high-priority cells always have precedence for transmission (D. Bertsekas, R. G. Gallager, "Data Networks," Prentice-Hall, 1987).

In a priority control scheme called push-out priority control, a single common buffer is used, and when the buffer is full of high-priority and low-priority cells, if a high-priority cell arrives, a low-priority cell in the buffer is discarded. That is, when the buffer overflows, cells are discarded in the order of ascending priority, the lowest priority cell first.

In a priority control scheme called nested threshold, a common buffer is used in which a plurality of threshold values are provided corresponding to a plurality of priority classes, and when the cell length in the buffer has exceeded a certain threshold, any arriving cell having a priority lower than that is discarded and is not stored in the buffer (K. Baba, et al., "On Multiplexing Effect for Bursty Traffic with Priorities Using Layered Modeling Approach in ATM Networks," Trans. IEICE, J76-B-I, pp. 219–230, Mar. 1991, and U.S. Pat. No. 4,953,157).

In a classified priority control scheme (quality control with multiple queues), a plurality of buffers are provided, one for each priority class, and higher priority cells are transmitted at higher priorities. In this control scheme, cell discard occurs in each buffer independently of the other cells. (Y. Takagi, et al., "Cell Transfer Quality Control in an ATM Network," Trans. IEICE, J74-B-I, pp. 180–189, Mar. 1989).

On the other hand, the present inventor proposed, in PCT/JP93/01243, a technique for evaluating the QOS on the safe side within a practical time by using the characteristic values of incoming traffic, based on the study on the upper and lower bounds for a three-dimensional probability distribution with cell arrival count $a_t$, cell arrival rate $r_t$, and cell count (cell length) $q_t$ within a buffer in a unit time as random variables. By applying this technique to a set of call sources having a priority higher than a predetermined priority level, the technique is extended to enable the QOS to be evaluated on the safe side within a practical time from the characteristic values of incoming traffic for a case where priority control is performed by preemptive resume priority for cell transmission and by push-out control for cell discard.

However, with regard to the buffer reservation scheme and the classified priority control scheme, no relationships between parameters defining the input end and the probability distributions of the cell length in the buffer are given in the above references dealing with the other control schemes; therefore, appropriate criteria for the amount of traffic for each priority class that satisfies the desired QOS are not provided, or if a method is available that can calculate the amount, the amount of calculation is so large that practical evaluation is difficult, and further, there is no guarantee that the evaluation can be made on the safe side.

Furthermore, it is desirable that each threshold value in the nested threshold scheme and the size of each buffer in the classified priority control scheme be designed properly to match the distribution of priority classes in actual traffic and be made variable in dynamic fashion with subsequent variations in the traffic characteristics. However, methods of implementing such techniques are not shown in the above references.

SUMMARY OF THE INVENTION

An object of the present invention is to provide a method and apparatus for evaluating the QOS, after multiplexing, on the safe side within a practical time from the characteristic values of incoming traffic in an ATM multiplexing apparatus in which priority control by nested threshold or by a classified priority control scheme is performed.

Another object of the present invention is to provide a method and apparatus for controlling call admission on the basis of the above evaluation.

A further object of the present invention is to provide a method and apparatus for optimizing the buffer design, on the basis of the above evaluation, to match the distribution of priority classes in actual traffic.

According to the present invention, there is provided a method of evaluating the QOS in an ATM multiplexing apparatus in which priority control is performed, comprising the steps of:

a) storing data concerning upper and lower bounds of a probability distribution of the number of arrivals for each of a plurality of values of an arrival rate;

b) determining upper and lower bounds of a probability distribution of the arrival rate in a call admitted state that is to be evaluated;

c) for each of a plurality of appearance values of the arrival rate, determining by reference to the data stored in step a) the upper and lower bounds of the probability distribution of the number of arrivals occurring along upper and lower bounds of an average time series averaged over possible time series from an average arrival rate to the appearance value;

d) calculating upper and lower bounds of a probability distribution of a cell length corresponding to each of said plurality of appearance values of the arrival rate by solving a state equation formulating a cell multiplexing process including the priority control by substituting into said state equation the upper and lower bounds of the probability distribution of the number of arrivals determined in step c);

e) calculating upper and lower limit values of QOS parameters for each of said plurality of appearance values of the arrival rate by using the upper and lower bounds of the cell length probability distribution calculated in step d); and f) evaluating the QOS by taking a weighted average of the results calculated in step e) by using the upper and lower bounds of the arrival rate probability distribution determined in step b).

According to the present invention, there is also provided a method of controlling call admission in an ATM multiplexing apparatus in which priority control is performed, comprising the steps of:

a) storing data concerning the upper and lower bounds of a probability distribution of the number of arrivals for each of a plurality of values of an arrival rate;

b) determining upper and lower bounds of a probability distribution of the arrival rate in a call admitted state that is to be evaluated;

c) for each of a plurality of appearance values of the arrival rate, determining by reference to the data stored in step a) the upper and lower bounds of the probability distribution of the number of arrivals occurring along upper and lower bounds of an average time series averaged over possible time series from an average arrival rate to the appearance value;

d) calculating upper and lower bounds of a probability distribution of a cell length corresponding to each of said plurality of appearance values of the arrival rate by solving a state equation formulating a cell multiplexing process, including priority control by substituting, into said state equation of the upper and lower bounds of the probability distribution of the number of arrivals determined in step c);

e) calculating upper and lower limit values of QOS parameters for each of said plurality of appearance values of the arrival rate by using the upper and lower bounds of the cell length probability distribution calculated in step d);

f) evaluating the QOS by taking a weighted average of the results calculated in step e) by using the upper and lower bounds of the arrival rate probability distribution determined in step b); and g) judging whether to admit or reject a call on the basis of said evaluated QOS.

According to the present invention, there is also provided a method of optimizing priority control in an ATM multiplexing apparatus in which priority control is performed, comprising the steps of:

a) storing data concerning upper and lower bounds of a probability distribution of the number of arrivals for each of a plurality of values of an arrival rate;

b) determining upper and lower bounds of a probability distribution of the arrival rate in a call admitted state that is to be evaluated;

c) for each of a plurality of appearance values of the arrival rate, determining by reference to the data stored in step a) the upper and lower bounds of the probability distribution of the number of arrivals occurring along upper and lower bounds of an average time series averaged over possible time series from an average arrival rate to the appearance value;

d) calculating upper and lower bounds of a probability distribution of a cell length corresponding to each of said plurality of appearance values of the arrival rate by solving a state equation formulating a cell multiplexing process including priority control by substituting into said state equation the upper and lower bounds of the probability distribution of the number of arrivals determined in step c);

e) calculating upper and lower limit values of QOS parameters for each of said plurality of appearance values of the arrival rate by using the upper and lower bounds of the cell length probability distribution calculated in step d);

f) evaluating the QOS by taking a weighted average of the results calculated in step e) by using the upper and lower bounds of the arrival rate probability distribution determined in step b); and g) optimizing the priority control on the basis of said evaluated QOS.

According to the present invention, there is also provided an apparatus, for evaluating the QOS in an ATM multiplexing apparatus in which priority control is performed, comprising:

storing means for storing data concerning upper and lower bounds of a probability distribution of the number of arrivals for each of a plurality of values of an arrival rate;

first determining means for determining upper and lower bounds of a probability distribution of the arrival rate in a call admitted state that is to be evaluated;

second determining means for determining, for each of a plurality of appearance values of the arrival rate by reference to the data stored in said storing means, the upper and lower bounds of the probability distribution of the number of arrivals occurring along upper and lower bounds of an average time series averaged over possible time series from an average arrival rate to the appearance value;

first calculating means for calculating upper and lower bounds of a probability distribution of a cell length corresponding to each of said plurality of appearance values of the arrival rate by solving a state equation formulating a cell multiplexing process, including priority control, by substituting into said state equation the upper and lower bounds of the probability distribution of the number of arrivals determined by said second determining means;

second calculating means for calculating upper and lower limit values of QOS parameters for each of said plurality of appearance values of the arrival rate by using the upper and lower bounds of the cell length probability distribution calculated by said first calculating means; and evaluating means for evaluating the QOS by taking a weighted average of the results calculated by said second calculating means by using the upper and lower bounds of the arrival rate probability distribution determined by said first determining means.

According to the present invention, there is also provided an apparatus for controlling call admission in an ATM multiplexing apparatus, in which priority control is performed, comprising:

storing means for storing data concerning upper and lower bounds of a probability distribution of the number of arrivals for each of a plurality of values of an arrival rate;

first determining means for determining upper and lower bounds of a probability distribution of arrival rate in a call admitted state that is to be evaluated;

second determining means for determining, for each of a plurality of appearance values of the arrival rate by reference to the data stored in said storing means, the upper and lower bounds of the probability distribution of the number of arrivals occurring along upper and lower bounds of an average time series averaged over possible time series from an average arrival rate to the appearance value;

first calculating means for calculating upper and lower bounds of a probability distribution of a cell length corresponding to each of said plurality of appearance values of the arrival rate by solving a state equation formulating a cell multiplexing process, including priority control, by substituting into said state equation the upper and lower bounds of the probability distribution of the number of arrivals determined by said second determining means;

second calculating means for calculating upper and lower limit values of QOS parameters for each of said plurality of appearance values of the arrival rate by using the upper and lower bounds of the cell length probability distribution calculated by first calculating means;

evaluating means for evaluating the QOS by taking a weighted average of the results calculated by said second calculating means by using the upper and lower bounds of the arrival rate probability distribution determined by said first determining means; and judging means for judging whether to admit or reject a call on the basis of said evaluated QOS.

According to the present invention, there is also provided an apparatus for optimizing priority control in an ATM multiplexing apparatus in which priority control is performed, comprising:

storing means for storing data concerning upper and lower bounds of a probability distribution of the number of arrivals for each of a plurality of values of an arrival rate;

first determining means for determining upper and lower bounds of a probability distribution of arrival rate in a call admitted state that is to be evaluated;

second determining means for determining, for each of a plurality of appearance values of the arrival rate by reference to the data stored in said storing means, the upper and lower bounds of the probability distribution of the number of arrivals occurring along upper and lower bounds of an average time series averaged over possible time series from an average arrival rate to the appearance value;

first calculating means for calculating upper and lower bounds of a probability distribution of a cell length corresponding to each of said plurality of appearance values of the arrival rate by solving a state equation formulating a cell multiplexing process including the priority control by substituting into said state equation the upper and lower bounds of the probability distribution of the number of arrivals determined by said second determining means;

second calculating means for calculating upper and lower limit values of QOS parameters for each of said plurality of appearance values of the arrival rate by using the upper and lower bounds of the cell length probability distribution calculated by the first calculating means;

evaluating means for evaluating the QOS by taking a weighted average of the results calculated by said second calculating means by using the upper and lower bounds of the arrival rate probability distribution determined by said first determining means; and optimizing means for optimizing the priority control on the basis of said evaluated QOS.

BRIEF DESCRIPTION OF THE DRAWINGS

FIG. 7 is a flowchart for determining weighted average values of arrival rates.

DESCRIPTION OF THE PREFERRED EMBODIMENTS

Figure 1:
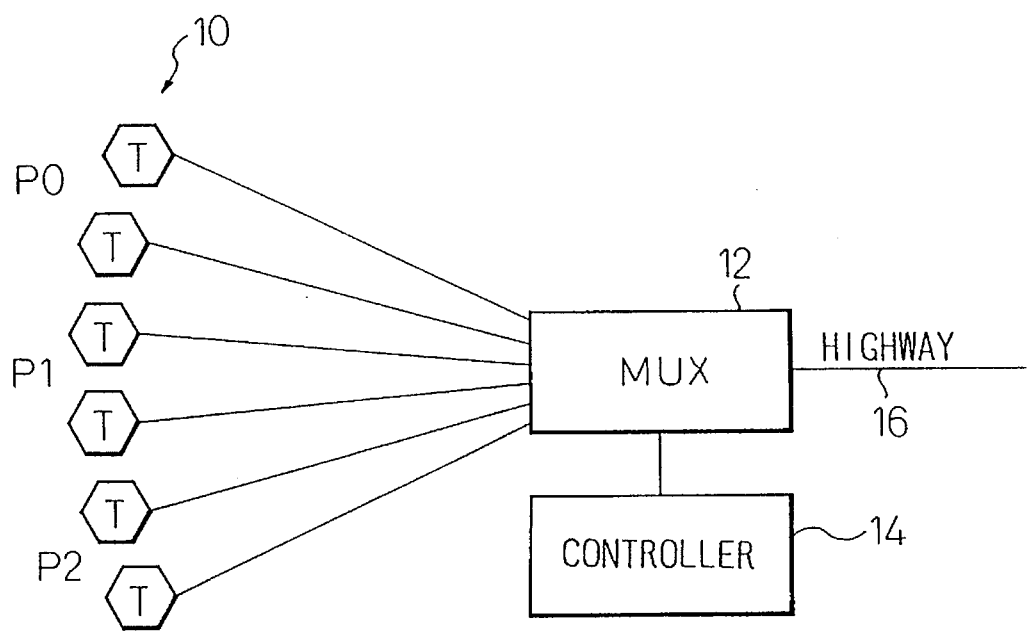
FIG. 1 is a diagram showing the basic configuration of a system in which the present invention is embodied.

FIG. 1 shows the basic configuration of a system in which the present invention is embodied. In the figure, the numeral 10 designates a subscriber line, whose peak rate, average rate, and peak duration are monitored and controlled by a usage parameter control (UPC) apparatus not shown. Of the subscriber lines in the figure, the terminal engaged in communication using a call class corresponding to high-priority traffic is designated as P0, the terminal engaged in communication using a call class corresponding to medium-priority traffic as P1, and the terminal engaged in communication using a call class corresponding to low-priority traffic as P2. MUX 12 is a multiplexer, and Controller 14 is a part responsible for control of the multiplexer, the MUX 12 and Controller 14 together constituting the present invention. The output of the MUX 12 is coupled to Highway 16, and multiplexed cells are output on the Highway 16.

Figure 2:
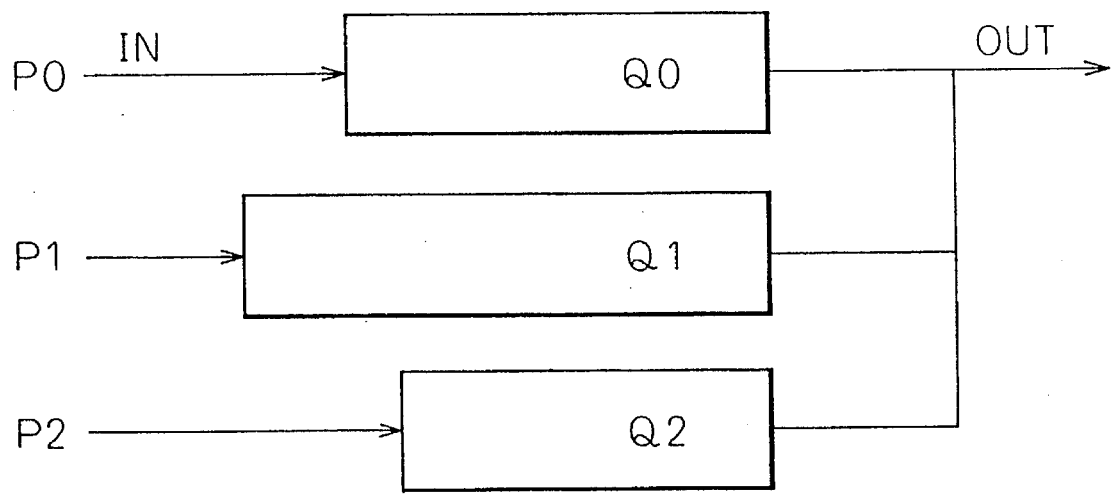
FIG. 2 shows a diagram showing a buffer configuration in a classified priority control scheme.

FIG. 2 shows the configuration of buffers provided one for each priority class according to a classified priority control scheme. The buffer configuration shown corresponds to the buffer configuration in the MUX 12 in FIG. 1. In FIG. 2, cells arriving at input IN are stored in respective FIFO buffers Q0 to Q2 according to the priorities P0 to P2 assigned to the cells. If the corresponding buffer is full, any arriving cell is discarded. In the figure, P0 has the highest priority, P1 the second highest priority, and P2 the lowest priority. In the figure, three priority classes are described, but the same description applies for cases where other numbers of priority classes are provided.

In the classified priority control scheme, the probability distribution of the cell count (cell length) in a buffer of a certain priority class (hereinafter called the cell length distribution) is dependent on the cell length distribution in the buffer of a higher priority. Here, let the priority class currently under attention be denoted as k. The condition for a cell to be output from a buffer of class k is:

(1) there is a cell in the buffer of class k, or a cell of class k arrives at time t, and (2) no cells are output having a higher priority (=0, 1, . . . , k−1) than class k.

The above condition can be expressed mathematically as follows. Let the cell length distribution in the buffer of priority k at time t be denoted as $q_t^{(k)}(x)$, and the probability distribution of the number of cell arrivals as $a_t^{(k)}(x)$. If $v_t^{(k)}$ is a random variable representing the number of cells (0 or 1) output from the buffer of priority k at time t, then its discrete probability density function is given by $$v_t^{(k)}(1) = (1 - a_t^{(k)}(0)q_t^{(k)}(0)) \cdot \left( \prod_{i=0}^{k-1} v_t^{(i)}(0) \right) \quad (1)$$

Here, the first term corresponds to condition (1), and the second term to condition (2). From the above expression, it can be seen that the cell length distribution of priority k is dependent only on the cell length distribution of a higher priority. From the normalization condition of probability, the following expression holds.

$$v_t^{(k)}(0) + v_t^{(k)}(1) = 1 \quad (2)$$

Hence, the cell length in the buffer of priority k at time t+1 is given by $$q_{t+1}^{(k)} = \min(L^{(k)}, \max(0, q_t^{(k)} + a_t^{(k)} - v_t^{(k)})) \quad (3)$$

where $L^{(k)}$ is the buffer length of the call class corresponding to priority k. Using a transition probability matrix, Expression (3) is rewritten $$q_{t+1} = S_t q_t \quad (4)$$

where vectors $q_{t+1}$ and $q_t$ of magnitude $L^{(k)}+1$, are discrete probability distributions representing the cell length distributions in the buffer, and $S_t$ is a probability transition matrix of size $(L^{(k)}+1) \times (L^{(k)}+1)$, whose elements are calculated from probability distributions $a_t^{(k)}(x)$ and $v_t^{(k)}(x)$ using Expression (3). For simplicity of notation, the superscript (k) denoting the priority class is omitted hereinafter. Using the column vectors, the matrix S is expressed as $$S_t = [s_0 s_1 \ldots s_L] \quad (5)$$

Then, by definition, each vector $s_i$ is a discrete probability distribution in which the sum of the elements is unity, and when the number of input call sources to the ATM multiplexing apparatus is n, if $L \geq n+i$, then $$s_i = \begin{pmatrix} 0 \\ \cdot \\ \cdot \\ \cdot \\ 0 \\ a_t(0)v_t(1) \\ a_t(0)v_t(0) + a_t(1)v_t(1) \\ \cdot \\ \cdot \\ a_t(x)v_t(0) + a_t(x+1)v_t(1) \\ \cdot \\ \cdot \\ a_t(n)v_t(0) \\ 0 \\ \cdot \\ \cdot \\ \cdot \\ 0 \end{pmatrix} \begin{matrix} \\ \\ \\ \\ < i-1 \\ \\ \\ \\ \\ \\ \\ < n+i \\ \\ \\ \\ \\ \end{matrix} \quad (6)$$

and if L<n+i, then $$s_i = \begin{pmatrix} 0 \\ \cdot \\ \cdot \\ \cdot \\ 0 \\ a_t(0)v_t(1) \\ a_t(0)v_t(0) + a_t(1)v_t(1) \\ \cdot \\ \cdot \\ a_t(x)v_t(0) + a_t(x+1)v_t(1) \\ \cdot \\ \cdot \\ a_t(L-i+2)v_t(0) + \sum_{x=L-i+1}^{n} a_t(x) \end{pmatrix} \begin{matrix} \\ \\ \\ \\ < i-1 \\ \\ \\ \\ \\ \\ \\ \end{matrix} \quad (7)$$

Here, by applying the technique described in the aforementioned PCT/JP 93/01243, the upper and lower limit values of QOS are evaluated for each priority class in accordance with the following steps, which are shown in FIG. 7 as steps 1300 to 1305.

i) Normal distributions or Poisson distributions that can define the upper and lower bounds for the probability distribution of the arrival count $a_t$ at each appearance value of the arrival rate $r_t$ are determined by numerical calculation. Namely, the upper and lower bounds for the probability distribution of the number of arrivals $a_t$ at each appearance value of the arrival rate $r_t$ are determined and stored in step 1300 of FIG. 7.

ii) Normal distributions that can define the upper and lower bounds for the probability distribution of the arrival rate $r_t$ are determined on the basis of the peak rate, average rate, and degree of multiplexing of each call source in the call admitted state to be evaluated. Namely, the upper and lower bounds of the probability distribution of the arrival rate $r_t$ of the call admitted state are determined in step 1301 of FIG. 7.

iii) For each of the appearance values of a plurality of arrival rates, a time series of matrix $S_t$ (more strictly upper bound $\overline{S}_t$ and lower bound $\underline{S}_t$ of matrix $S_t$) for the time series that can define the upper and lower bounds of the average time series averaged over possible time series $\{r_t\}$ from the average arrival rate to the appearance value, are calculated using the result of step i) in step 1302 of FIG. 7, and then, by solving the state equation (4) using the calculated result, the cell length distribution is determined for each appearance value of the arrival rate $r_t$ in step 1303 of FIG. 7.

iv) Using the result of step iii), the upper and lower limit values of QOS parameters are calculated for each appearance value of the arrival rate $r_t$ in step 1304 of FIG. 7, and then by using the result of step ii), their weighted average values are obtained in step 1305, to evaluate the QOS parameters such as cell loss rate, delay time, etc.

In step iii), the upper bound $\overline{S}_t$ for $S_t$ is calculated from the upper bound $\overline{a}_t(x)$ of $a_t(x)$ and the lower bound $\underline{v}_t(x)$ of $v_t(x)$ from Expression (3). Similarly, the lower bound $\underline{S}_t$ for $S_t$ is calculated from the lower bound $\underline{a}_t(x)$ of $a_t(x)$ and the upper bound $\overline{v}_t(x)$ of $v_t(x)$ from Expression (3).

From Expression (1), the lower bound $\underline{v}_t(x)$ for the cell transmission probability is calculated recursively by using the upper and lower bounds of $a_t(x)$, $q_t(x)$, and $v_t(x)$ in the order of descending priority for a given arrival rate $r_t$. These can be expressed mathematically as follows. As in Expression (5), using the column vector the upper bound $\overline{S}_t$ of the matrix $S_t$ is written $$\overline{S}_t = [\overline{s}_0 \overline{s}_1 \ldots \overline{s}_L] \quad (8)$$

Note that each column vector in (8) provides the upper bound for the corresponding column vector in (5) and that the discrete probability distributions in Expressions (6) and (7) are obtained by the convolution of $a_t(x)$ and $v_t(-x)$. Then, if $L \geq n+i$, the upper bound vector is $$\overline{s}_i = \begin{pmatrix} 0 \\ \cdot \\ \cdot \\ \cdot \\ 0 \\ \overline{a}_i(0)\underline{v}_i(1) \\ \overline{a}_i(0)\underline{v}_i(0) + \overline{a}_i(1)\underline{v}_i(1) \\ \cdot \\ \cdot \\ \cdot \\ \overline{a}_i(x)\underline{v}_i(0) + \overline{a}_i(x+1)\underline{v}_i(1) \\ \cdot \\ \cdot \\ \cdot \\ \overline{a}_i(n)\underline{v}_i(0) \\ 0 \\ \cdot \\ \cdot \\ \cdot \\ 0 \end{pmatrix} \begin{matrix} \\ \\ \\ \\ < i-1 \\ \\ \\ \\ \\ \\ \\ \\ \\ \\ < n+i \\ \\ \\ \\ \end{matrix}$$

and if $L < n+i$ $$\overline{s}_i = \begin{pmatrix} 0 \\ \cdot \\ \cdot \\ 0 \\ \overline{a}_i(0)\underline{v}_i(1) \\ \overline{a}_i(0)\underline{v}_i(0) + \overline{a}_i(1)\underline{v}_i(1) \\ \cdot \\ \cdot \\ \overline{a}_i(x)\underline{v}_i(0) + \overline{a}_i(x+1)\underline{v}_i(1) \\ \cdot \\ \cdot \\ \overline{a}_i(L-i+2)\underline{v}_i(0) + \Sigma_{x=L-i+1}^{n}\overline{a}_i(x) \end{pmatrix} \begin{matrix} \\ \\ \\ < i-1 \\ \\ \\ \\ \\ \\ \\ \end{matrix}$$

Likewise, for the lower bound, if $L \geq n+i$, then $$\underline{s}_i = \begin{pmatrix} 0 \\ \cdot \\ \cdot \\ 0 \\ \underline{a}_i(0)\overline{v}_i(1) \\ \underline{a}_i(0)\overline{v}_i(0) + \underline{a}_i(1)\overline{v}_i(1) \\ \cdot \\ \cdot \\ \underline{a}_i(x)\overline{v}_i(0) + \underline{a}_i(x+1)\overline{v}_i(1) \\ \cdot \\ \cdot \\ \underline{a}_i(n)\overline{v}_i(0) \\ 0 \\ \cdot \\ \cdot \\ 0 \end{pmatrix} \begin{matrix} \\ \\ \\ \\ < i-1 \\ \\ \\ \\ \\ \\ \\ \\ < n+i \\ \\ \\ \end{matrix}$$

and if L<n+i, then $$s_i = \begin{pmatrix} 0 \\ \cdot \\ \cdot \\ \cdot \\ 0 \\ \underline{a_t}(0)\overline{v_t}(1) \\ \underline{a_t}(0)\overline{v_t}(0) + \underline{a_t}(1)\overline{v_t}(1) \\ \cdot \\ \cdot \\ \underline{a_t}(x)\overline{v_t}(0) + \underline{a_t}(x+1)\overline{v_t}(1) \\ \cdot \\ \cdot \\ \cdot \\ \underline{a_t}(L-i+2)\overline{v_t}(0) + \Sigma_{x=L-i+1}^{n}\underline{a_t}(x) \end{pmatrix} \quad < i-1$$

The upper and lower bounds for the cell transmission probability $v_t(x)$ are calculated recursively in the order of descending priority, as follows.

$$\overline{v_t^{(k)}}(1) = (1 - \overline{a_t^{(k)}}(0)\overline{q_t^{(k)}}(0)) \cdot \left( \prod_{i=0}^{k-1} \overline{v_t^{(i)}}(0) \right) \quad (9)$$

$$\overline{v_t^{(k)}}(0) = 1 - \overline{v_t^{(k)}}(1)$$

Similarly, $$\underline{v_t^{(k)}}(1) = (1 - \underline{a_t^{(k)}}(0)\underline{q_t^{(k)}}(0)) \cdot \left( \prod_{i=0}^{k-1} \underline{v_t^{(i)}}(0) \right) \quad (10)$$

$$\underline{v_t^{(k)}}(0) = 1 - \underline{v_t^{(k)}}(1)$$

The details and validity of the above technique, as well as the amount of calculation involved, are described in the previous application PCT/JP 93/01243.

The technique of the present application evaluates the QOS for each priority class k in the order of descending priority by using the matrix $S_t^{(k)}$ defined by Expressions (5) to (7) in this application instead of the matrix M defined by Expression (3) in the previous application. Furthermore, as disclosed in the specification of the previous application, if each QOS parameter is precalculated for all possible combinations of average arrival rate $r_0$ and slope k of the time series of the upper and lower bounds, taken at prescribed intervals, and the results are prestored as a table, the calculation time can be further reduced.

Figure 3:
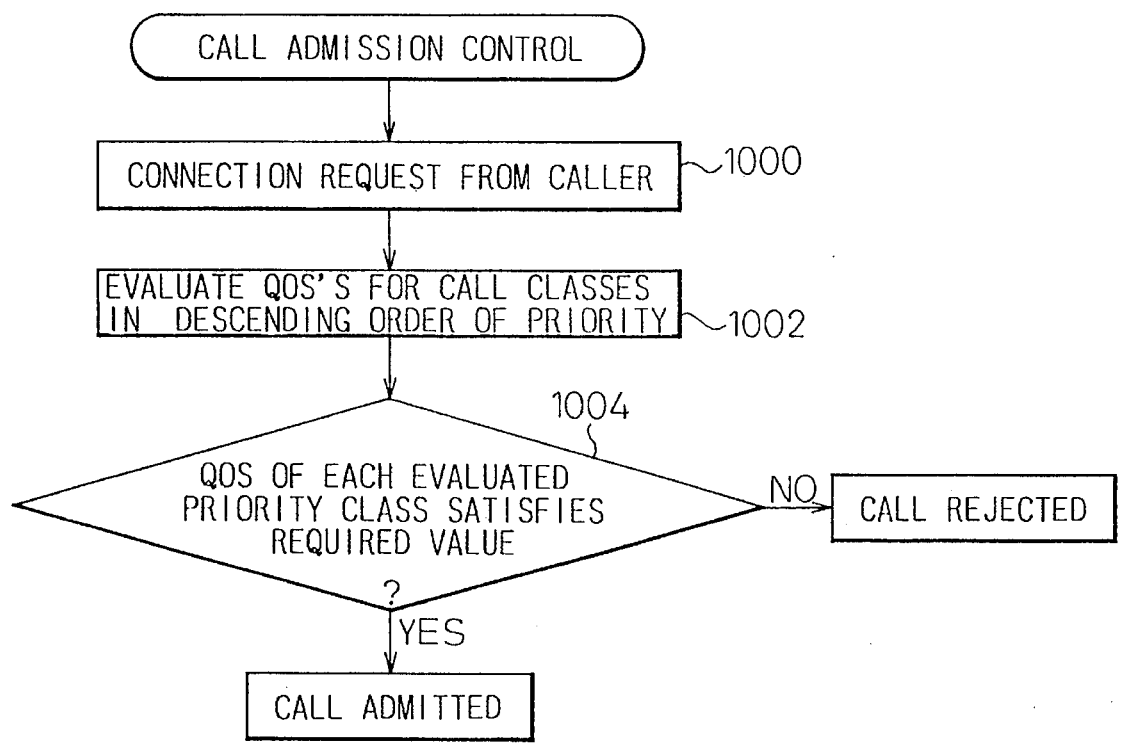
FIG. 3 is a flowchart for call admission control according to the present invention.

FIG. 3 is a flowchart illustrating a call admission control process according to the present invention. When there is a call admission request from a caller (step 1000), the QOS is evaluated for the call classes of the currently established connections plus the requested connection in the order of descending priority by applying the above technique (step 1002). Next, it is determined whether the QOS of each priority class satisfies the required value (step 1004); if the required value is satisfied, the requested call is admitted, and if not, the call is rejected.

Figure 4:
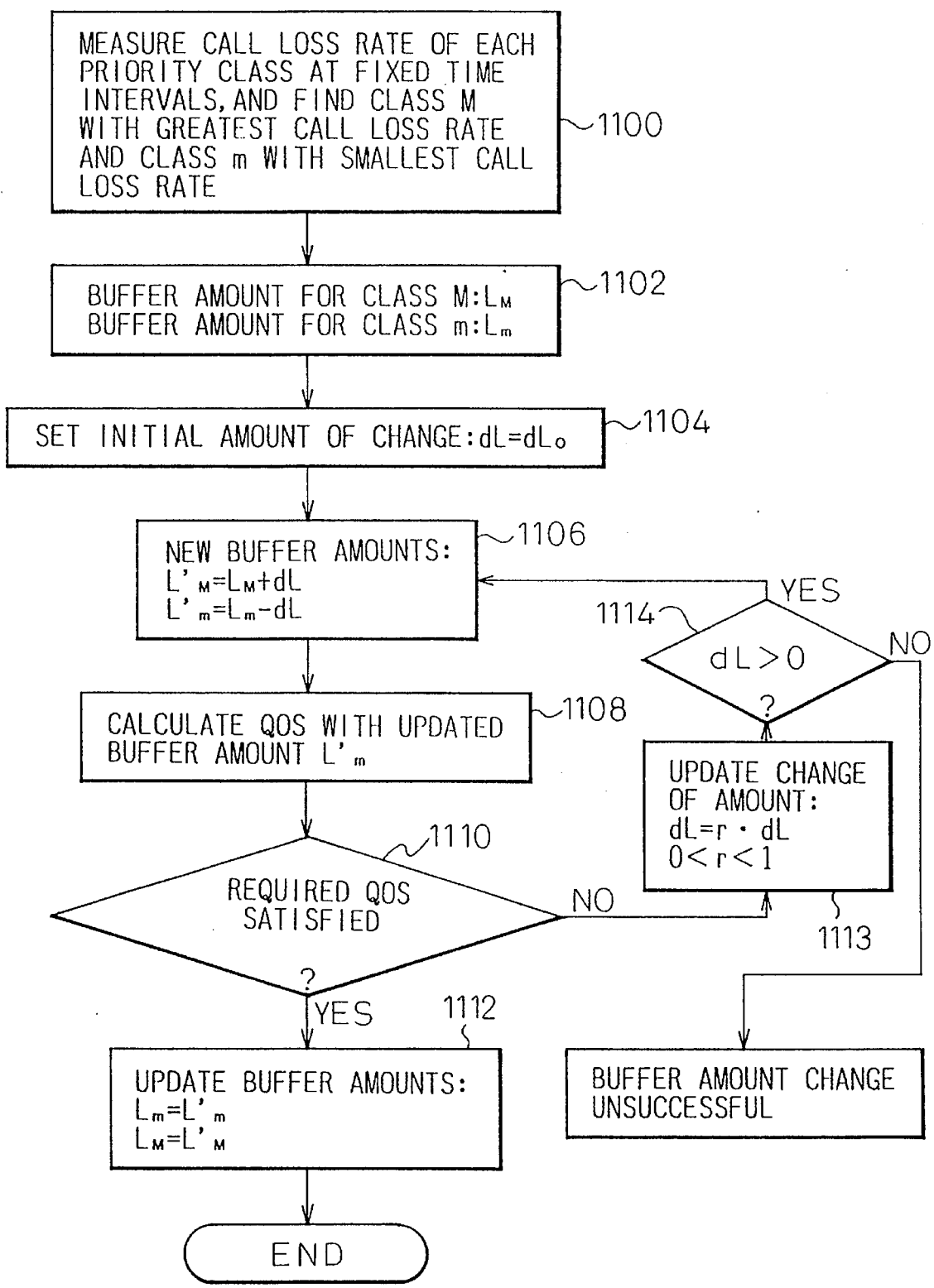
FIG. 4 is a flowchart for a buffer amount optimization process according to the present invention.

In the classified priority control scheme, since the QOS of each priority class depends on the buffer amount $L^{(k)}$ assigned to it, the call loss rate of each priority class also depends on $L^{(k)}$. From the viewpoint of fairness of service, large differences in call loss rate among priority classes are not desirable. According to the above technique, the QOS of a priority class after changing the assigned buffer amount $L^{(k)}$ can be predicted by calculation. Accordingly, by dynamically changing the buffer amount based on the prediction, variations in call loss rate among priority classes can be suppressed to optimize the buffer amount allocation. FIG. 4 is a flowchart illustrating a buffer amount optimization process according to the present invention. First, the call loss rate of each priority class is measured at fixed time intervals to find class M with the largest call loss rate and class m with the smallest call loss rate (step 1100). The current buffer amount for class M with the largest call loss rate is designated as $L_M$, and that for class m with the smallest call loss rate as $L_m$ (step 1102). Initial value $dL_0$ is substituted for the amount of change dL (step 1104), and using this dL, new buffer amounts $L'_M$ and $L'_m$ are calculated (step 1106). For class m for which the buffer amount is to be reduced, the QOS is evaluated using the new buffer amount $L'_m$ (step 1108), and if the required value is satisfied (step 1110), then the buffer amount is actually changed (step 1112). If the required value is not satisfied, the amount of change dL is multiplied by r (0<r<1) to update dL (step 1113); if the updated dL is not 0, the process returns to step 1106 to repeat the evaluation operation. If the updated dL becomes equal to 0, the buffer amount change is rendered unsuccessful. The initial amount of change $dL_0$ is, for example, calculated as $$dL_0 = \min(L^{(M)}/2, L^{(m)}/2)$$

The coefficient r used to update the amount of change dL is a constant defined as 0<r<1, and the value of r allows a trade-off between the amount of calculation required to find the changed buffer amount for use and the optimality of the amount of change.

Figure 5:
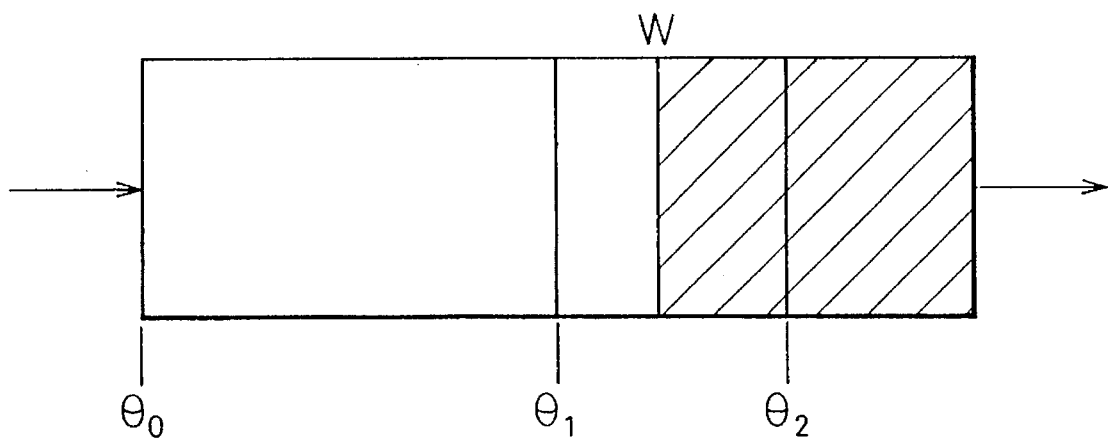
FIG. 5 is a diagram showing a buffer construction employed in a nested threshold priority control scheme.

FIG. 5 shows the construction of a single common buffer according to a nested threshold scheme. This buffer is a FIFO buffer, and the hatched portion is the portion of the buffer in which cells waiting for transmission are stored. The symbol W indicates the boundary between the portion of the buffer filled with cells and the vacant portion thereof, and is hereinafter called the water level. Cells arrive from the left, and the cells stored in the buffer are output to the right in the order in which they arrived. In the figure, $\theta_0$, $\theta_1$, and $\theta_2$ are threshold values used for priority control; in the example shown, three threshold values are provided corresponding to three-level priority control. According to the nested threshold scheme, when the water level is at $\theta_2$ or lower, cells of all priority classes P0, P1, P2 are admitted into the buffer; when the water level is between $\theta_1$ and $\theta_2$, cells of priority classes P0 and P1 are admitted; and when the water level is at $\theta_1$ or higher, only cells of priority class P0 are admitted and cells of other classes are discarded.

The following describes the cell length distribution in a buffer for safe-side evaluation of the QOS in a multiplexing apparatus that employs the nested threshold priority control scheme. In the nested threshold scheme, the variation of the cell length distribution depends on the current water level, i.e., the cell length in the buffer. When the water level is high, the discard rate of low-priority cells is high and the water level increases slowly.

Suppose that there are P+1 priority classes (0, 1, ... P) and P+1 corresponding threshold values ($\theta_0 = L$, $\theta_1$, ... $\theta_P$) in the buffer, where L is the buffer size. When the cell length is between thresholds $\theta_k$ and $\theta_{k+1}$, cells whose priority p is lower than k (p>k) are discarded, while cells with priority of k or higher (p≤k) are accepted for storage in the buffer. Denoting the cell length at time t as $q_t$ and that at time t+1 as $q_{t+1}$, when $\theta_k > q_t \geq \theta_{k+1}$ the above is given by $$q_{t+1} = \min\left( L, \max\left( 0, q_t + \sum_{p \leq k} a_t^{(p)} - 1 \right) \right) \quad (11)$$

where $a_t^{(p)}$ is the random variable representing the number of cells arriving from a call with a class of priority p. Using a transition probability matrix, as in Expression (4), the change of its probability distribution can be expressed as $$q_{t+1} = S_t q_t \quad (12)$$

Using the column vectors, the matrix $S_t$ can be written as the same as Expression (5). A specific representation of the column vectors will be obtained as follows. When the probability distribution corresponding to the random variable $a_t^{(p)}$ is expressed as $a_t^{(p)}(x)$, the probability distribution corresponding to the sum $b_t^{(k)} = \Sigma_{p \leq k} a_t^{(p)}$ is given by $$b_t^{(k)}(x) = a_t^{(0)} * a_t^{(1)} * \ldots a_t^{(k)}(x) \quad (13)$$

where * denotes the convolution of the probability distribution. At this time, when the number of input call sources to the ATM multiplexing apparatus is n, if $L \geq n+i$, column vector $S_i$ of $S_t$ is $$s_i = \begin{pmatrix} 0 \\ \cdot \\ \cdot \\ \cdot \\ 0 \\ b_t^{(P)}(0) \\ b_t^{(P)}(1) \\ \cdot \\ \cdot \\ \rule{1cm}{0.4pt} \\ \cdot \\ b_t^{(k)}(x) \\ \cdot \\ \rule{1cm}{0.4pt} \\ \cdot \\ b_t^{(0)}(n) \\ 0 \\ \cdot \\ \cdot \\ \cdot \\ 0 \end{pmatrix} \begin{matrix} \\ \\ \\ \\ \\ < i-1 \\ \\ \\ \\ < \theta_{k+1} \\ \\ \\ \\ < \theta_k \\ \\ < n+i \\ \\ \\ \\ \\ \end{matrix} \quad (14)$$

As can be seen, the superscripts on the vector elements change between threshold values $\theta_i$ ($i = 0, 1, \ldots P$). If $L < n+i$, then $$s_i = \begin{pmatrix} 0 \\ \cdot \\ \cdot \\ \cdot \\ 0 \\ b_t^{(P)}(0) \\ b_t^{(P)}(1) \\ \cdot \\ \cdot \\ \rule{1cm}{0.4pt} \\ \cdot \\ b_t^{(k)}(x) \\ \cdot \\ \rule{1cm}{0.4pt} \\ \cdot \\ \Sigma_{x=L-i+1}^{n} b_t^{(0)}(x) \end{pmatrix} \begin{matrix} \\ \\ \\ \\ \\ < i-1 \\ \\ \\ \\ < \theta_{k+1} \\ \\ \\ \\ < \theta_k \\ \\ \end{matrix} \quad (15)$$

Here, using Expression (13), the upper bound $\bar{b}_t^{(k)}(x)$ for $b_t^{(k)}(x)$ is calculated from the upper bound of the arrival count distribution in each priority class, and using the results, the upper bounds for the vectors (14) and (15) can be obtained. That is, if $L \geq n+i$, then

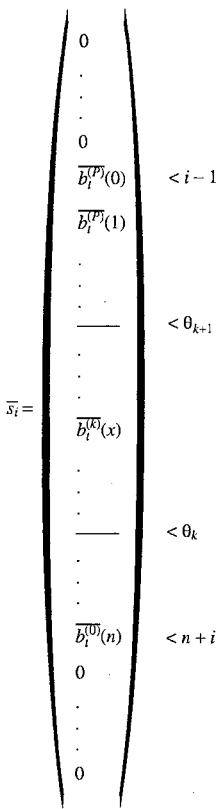

and if L<n+i, then

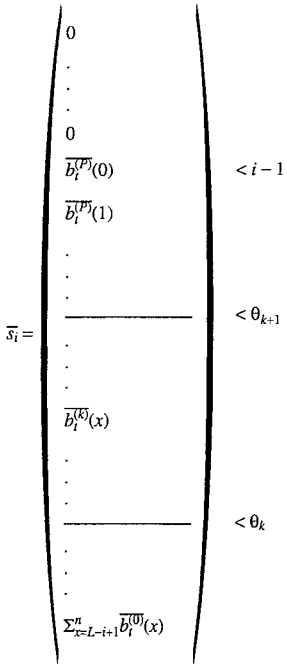

(17)

By solving the equation of Expression (12) for the upper and lower bounds of the average time series, the upper and lower bounds of the cell length distribution $q(x)$ in the buffer can be obtained, using which the QOS of each priority class is evaluated. For example, for calls of priority class k, cells are discarded when the cell length in the buffer is $\theta_k$ or greater; therefore, when the probability distribution of the number of arrivals of class k is denoted as $a_i^{(k)}$, the expected value $N^{(k)}$ of the number of lost cells is calculated as $$N^{(k)} = \sum_{x > \theta_k + 1} \{x - (\theta_k + 1)\} \cdot a_i^{(k)} * q(x) \quad (16)$$

When $N^{(k)}$ is divided by the expected value of the number of cell arrivals of priority class k, i.e., the average arrival rate $r_0^{(k)}$, then the cell loss rate $R^{(k)}$ is obtained. It is clear that the upper limit value is obtained from the probability distribution of upper bounds, and the lower limit value from the probability distribution of lower bounds.

In a multiplexing apparatus performing priority control by the nested threshold scheme, call admission control can be performed, using a procedure similar to the one illustrated in FIG. 3, by predicting the QOS for each priority class expected when the requested call is admitted.

Figure 6:
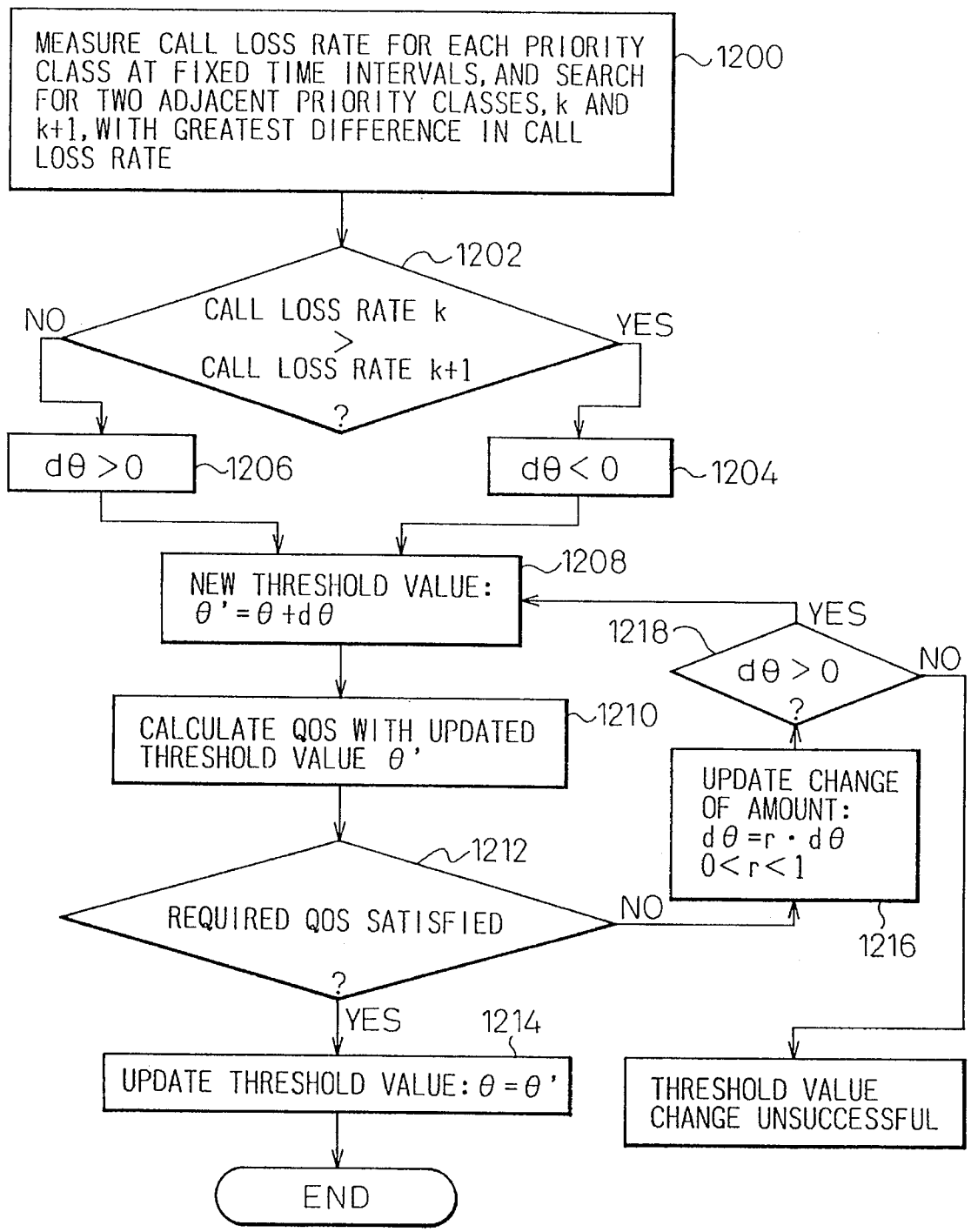
FIG. 6 is a flowchart for a threshold value optimization process according to the present invention.

In the nested threshold scheme, since the QOS of each priority class depends on the threshold value $\theta_k$, the call loss rate of each priority class also depends on $\theta_k$. Therefore, using the above technique for predicting the QOS when the threshold value $\theta_k$ is changed, the threshold value $\theta_k$ can be optimized by changing the threshold value $\theta_k$ within a range that does not degrade the QOS. FIG. 6 is a flowchart illustrating a threshold value optimization process according to the present invention. First, the call loss rate of each priority class is measured at fixed time intervals, to search for two adjacent priority classes k and k+1 having the greatest difference in call loss between them (step 1200). The call loss rate of class k is compared with that of class k+1 (step 1202); if the call loss rate of class k is larger, $d\theta$ is set to a positive initial value (step 1204), and if the call loss rate of class k+1 is larger, $d\theta$ is set to a negative initial value (step 1206). Using the thus set $d\theta$, a new threshold value is calculated from the threshold value $\theta$ (step 1208), and the QOS with the new threshold value $\theta'$ is evaluated (step 1210). If the evaluated QOS satisfies the required value (step 1212), the threshold value $\theta$ is actually changed to $\theta$ (step 1214). If the required value is not satisfied, the amount of change $d\theta$ is multiplied by r (0<r<1) to update the value of $d\theta$ (step 1216), and if the updated $d\theta$ is not 0 (step 1218), the process returns to step 1208 to repeat the evaluation operation. If the updated $d\theta$ becomes equal to 0, the threshold value change is rendered unsuccessful.

The initial value $d\theta$ for the amount of threshold value change, when $d\theta > 0$, is set as $$d\theta = (\theta_{k+1} - \theta_{k+2})/2$$

When $d\theta < 0$, it is set as $$d\theta = (\theta_{k+1} - \theta_k)/2$$

The coefficient r used to update the amount of change $d\theta$ is a constant defined as 0<r<1, and the value of r allows a trade-off between the amount of calculation required to find the changed buffer amount for use and the optimality of the amount of change.

The present invention can be implemented using a microcomputer of known configuration comprising an ordinary microprocessor, nonvolatile memory (ROM), random access memory (RAM), and an input/output interface. In the above embodiment, the data are stored in a nonvolatile memory, but in a configuration having a disk drive, data may be stored on a disk. As a processor, instead of using a general-purpose microprocessor, a special processor suitable for execution of the above algorithm or a dedicated processor capable of performing floating-point calculations at high speed may be used in combination. Furthermore, instead of adding an independent function for the execution of the above algorithm to the multiplexing apparatus or internetwork bridge apparatus as in the above-described configuration, the function as provided in the present embodiment may be implemented using part of an existing control function provided in the ATM multiplexing apparatus or internetwork bridge apparatus or by using a general-purpose workstation.

We claim:

1. A method of controlling admission of a requested call in an ATM multiplexing apparatus in which priority control is performed, comprising the steps of:

a) storing data concerning upper and lower bounds of a probability distribution of the number of arrivals for each of a plurality of values of an arrival rate;

b) determining upper and lower bounds of a probability distribution of the arrival rate in a call admitted state where the requested call is added to already admitted calls;

c) for each of a plurality of appearance values of the arrival rate, determining by reference to the data stored in step a) the upper and lower bounds of the probability distribution of the number of arrivals occurring along upper and lower bounds of an average time series averaged over possible time series from an average arrival rate to the appearance value;

d) calculating upper and lower bounds of a probability distribution of a cell length corresponding to each of said plurality of appearance values of the arrival rate by solving a state equation formulating a cell multiplexing process including the priority control by substituting into said state equation the upper and lower bounds of the probability distribution of the number of arrivals determined in step c);

e) calculating upper and lower limit values of QOS parameters for each of said plurality of appearance values of the arrival rate by using the upper and lower bounds of the cell length probability distribution calculated in step d);

f) evaluating the QOS by calculating a weighted average of the upper and lower limit values calculated in step e) by using the upper and lower bounds of the arrival rate probability distribution determined in step b);

g) judging whether to admit or reject the requested call on the basis of said evaluated QOS;

h) rejecting the requested call when the requested call is judged to be rejected in step g); and i) admitting the requested call when the requested call is judged to be admitted in step g).

2. A method according to claim 1, wherein
said priority control is classified priority control using a plurality of buffers for storing cells on a priority class basis,
said method further comprising the step of performing steps b) to f) on a set of calls belonging to each priority class, and
said state equation includes the contribution of a probability distribution of the number of cells output from a buffer of a priority class higher than a priority class of calls on which the QOS is evaluated.

3. A method according to claim 2, wherein said probability distribution of the number of output cells is calculated recursively from a probability distribution of the number of output cells in a priority class higher than a priority class on which the probability distribution is calculated.

4. A method according to claim 1, wherein
said priority control is nested threshold priority control using a single buffer with a plurality of threshold values corresponding to a plurality of priority classes, and
said state equation formulates the cell multiplexing process including said nested threshold priority control.

5. A method of optimizing priority control in an ATM multiplexing apparatus in which priority control is performed, comprising the steps of:

a) storing data concerning upper and lower bounds of a probability distribution of the number of arrivals for each of a plurality of values of an arrival rate;

b) determining upper and lower bounds of a probability distribution of the arrival rate;

c) for each of a plurality of appearance values of the arrival rate, determining by reference to the data stored in step a) the upper and lower bounds of the probability distribution of the number of arrivals occurring along upper and lower bounds of an average time series averaged over possible time series from an average arrival rate to the appearance value;

d) calculating upper and lower bounds of a probability distribution of a cell length corresponding to each of said plurality of appearance values of the arrival rate by solving a state equation formulating a cell multiplexing process including the priority control by substituting into said state equation the upper and lower bounds of the probability distribution of the number of arrivals determined in step c);

e) calculating upper and lower limit values of QOS parameters for each of said plurality of appearance values of the arrival rate by using the upper and lower bounds of the cell length probability distribution calculated in step d);

f) evaluating the QOS by calculating a weighted average of the upper and lower limit values calculated in step 3) by using the upper and lower bounds of the arrival rate probability distribution determined in step b); and g) changing means for changing control parameters of the priority control to optimize the priority control on the basis of said evaluated QOS.

6. A method according to claim 5, wherein
said priority control is classified priority control using a plurality of buffers for storing cells on a priority class basis,
said method further comprising the step of performing steps b) to f) on a set of calls belonging to each priority class,
said state equation includes contribution of a probability distribution of the number of cells output from a buffer of a priority class higher than a priority class of calls on which the QOS is evaluated, and
in step g), the control parameters are the length of the buffers.

7. A method according to claim 6, wherein said probability distribution of the number of output cells is calculated recursively from a probability distribution of the number of output cells in a priority class higher than a priority class on which the probability is calculated.

8. A method according to claim 5, wherein
said priority control is nested threshold priority control using a single buffer with a plurality of threshold values corresponding to a plurality of priority classes,
said state equation formulates the cell multiplexing process including said nested threshold priority control, and in step g), the control parameters are the values of the thresholds.

9. An apparatus for controlling admission of a requested call in an ATM multiplexing apparatus in which priority control is performed, comprising:

storing means for storing data concerning upper and lower bounds of a probability distribution of the number of arrivals for each of a plurality of values of an arrival rate;

first determining means for determining upper and lower bounds of a probability distribution of arrival rate in a call admitted state where the requested call is added to already admitted calls;

second determining means for determining, for each of a plurality of appearance values of the arrival rate by reference to the data stored in said storing means, the upper and lower bounds of the probability distribution of the number of arrivals occurring along upper and lower bounds of an average time series averaged over possible time series from an average arrival rate to the appearance value;

first calculating means for calculating upper and lower bounds of a probability distribution of a cell length corresponding to each of said plurality of appearance values of the arrival rate by solving a state equation formulating a cell multiplexing process including the priority control by substituting into said state equation the upper and lower bounds of the probability distribution of the number of arrivals determined by said second determining means;

second calculating means for calculating upper and lower limit values of QOS parameters for each of said plurality of appearance values of the arrival rate by using the upper and lower bounds of the cell length probability distribution calculated by the first calculating means;

evaluating means for evaluating the QOS by calculating a weighted average of the upper and lower limit values calculated by said second calculating means by using the upper and lower bounds of the arrival rate probability distribution determined by said first determining means;

judging means for judging whether to admit or reject the requested call on the basis of said evaluated QOS;

rejecting means for rejecting the requested call when the requested call is judged to be rejected by the judging means; and admitting means for admitting the requested call when the requested call is judged to be admitted, by the judging means.

10. An apparatus according to claim 9, wherein said priority control is classified priority control using a plurality of buffers for storing cells on a priority class basis, said apparatus further comprises means for activating the first and the second determining means, the first and the second calculating means, and the evaluating means for a set of calls belonging to each priority class, and said state equation includes contribution of a probability distribution of the number of cells output from a buffer of a priority class higher than a priority class of calls on which the QOS is evaluated.

11. An apparatus according to claim 10, wherein said probability distribution of the number of output cells is calculated recursively from a probability distribution of the number of output cells in a priority class higher than a priority class on which the probability distribution is calculated.

12. An apparatus according to claim 9, wherein said priority control is nested threshold priority control using a single buffer with a plurality of threshold values corresponding to a plurality of priority classes, and said state equation formulates the cell multiplexing process including said nested threshold priority control.

13. An apparatus for optimizing priority control in an ATM multiplexing apparatus in which priority control is performed, comprising:

storing means for storing data concerning upper and lower bounds of a probability distribution of the number of arrivals for each of a plurality of values of an arrival rate;

first determining means for determining upper and lower bounds of a probability distribution of arrival rate;

second determining means for determining, for each of a plurality of appearance values of the arrival rate by reference to the data stored in said storing means, the upper and lower bounds of the probability distribution of the number of arrivals occurring along upper and lower bounds of an average time series averaged over possible time series from an average arrival rate to the appearance value;

first calculating means for calculating upper and lower bounds of a probability of a cell length corresponding to each of said plurality of appearance values of the arrival rate by solving a state equation formulating a cell multiplexing process including the priority control by substituting into said state equation the upper and lower bounds of the probability distribution of the number of arrivals determined by said second determining means;

second calculating means for calculating upper and lower limit values of QOS parameters for each of said plurality of appearance values of the arrival rate by using the upper and lower bounds of the cell length probability distribution calculated by first calculating means;

evaluating means for evaluating the QOS by calculating a weighted average of the upper and lower limit values calculated by said second calculating means by using the upper and lower bounds of the arrival rate probability distribution determined by said first determining means; and changing means for changing control parameters of the priority control to optimize the priority control on the basis of said evaluated QOS.

14. An apparatus according to claim 13, wherein said priority control is classified priority control using a plurality of buffers for storing cells on a priority class basis, said apparatus further comprises means for activating the first and the second determining means, the first and the second calculating means, and the evaluating means for a set of calls belonging to each priority class, said state equation includes the contribution of a probability distribution of the number of cells output from a buffer of a priority class higher than a priority class of calls on which the QOS is evaluated, and said changing means changes the the lengths of the buffers.

15. An apparatus according to claim 14, wherein said probability distribution of the number of output cells is calculated recursively from a probability distribution of the number of output cells in a priority class higher than a priority class on which the probability is calculated.

16. An apparatus according to claim 13, wherein said priority control is nested threshold priority control using a single buffer with a plurality of threshold values corresponding to a plurality of priority classes, said state equation formulates the cell multiplexing process including said nested threshold priority control, and said changing means changes the values of the thresholds.

* * * * *